US 6,639,570 B2

(12) United States Patent
Furness, III et al.

(10) Patent No.: US 6,639,570 B2
(45) Date of Patent: *Oct. 28, 2003

(54) RETINAL DISPLAY SCANNING OF IMAGE WITH PLURALITY OF IMAGE SECTORS

(75) Inventors: Thomas Adrian Furness, III, Seattle, WA (US); Joel S. Kollin, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/918,329

(22) Filed: Jul. 30, 2001

(65) Prior Publication Data

US 2001/0043208 A1 Nov. 22, 2001

Related U.S. Application Data

(63) Continuation of application No. 09/312,932, filed on May 17, 1999, now Pat. No. 6,317,103, which is a continuation of application No. 08/911,989, filed on Aug. 13, 1997, now Pat. No. 6,008,781, which is a continuation of application No. 08/485,630, filed on Jun. 7, 1995, now Pat. No. 5,659,327, which is a continuation of application No. 07/965,070, filed on Oct. 22, 1992, now Pat. No. 5,467,104.

(51) Int. Cl.[7] .................................................. G09G 3/02
(52) U.S. Cl. ............................................................. 345/8
(58) Field of Search .......................... 345/7–9, 32; 348/53, 348/750; 340/980; 359/630, 631

(56) References Cited

U.S. PATENT DOCUMENTS

| 4,028,725 A | * | 6/1977 | Lewis |
| 4,109,237 A | * | 8/1978 | Hill |
| 4,361,384 A | * | 11/1982 | Bosserman |
| 4,562,461 A | * | 12/1985 | Yin .............................. 348/750 |
| 4,662,731 A | * | 5/1987 | Robert et al. |
| 4,702,575 A | * | 10/1987 | Breglia |
| 4,764,005 A | * | 8/1988 | Webb et al. |
| 4,765,730 A | * | 8/1988 | Webb |
| 4,768,873 A | * | 9/1988 | Webb |
| 4,768,874 A | * | 9/1988 | Webb et al. |
| 4,838,679 A | * | 6/1989 | Bille |
| 4,854,692 A | * | 8/1989 | Kobayashi |
| 4,859,846 A | * | 8/1989 | Burrer |
| 4,902,083 A | * | 2/1990 | Wells |
| 4,934,773 A | * | 6/1990 | Becker |
| 4,942,766 A | * | 7/1990 | Greenwood et al. |
| 5,121,138 A | * | 6/1992 | Schermet et al. |
| 5,162,828 A | * | 11/1992 | Furness et al. |
| 5,369,415 A | * | 11/1994 | Richard et al. |
| 5,467,104 A | * | 11/1995 | Furness, III et al. |
| 5,596,339 A | * | 1/1997 | Furness, III et al. |
| 5,659,327 A | * | 8/1997 | Furness, III et al. |
| 6,008,781 A | * | 12/1999 | Furness, III et al. |
| 6,317,103 B1 | * | 11/2001 | Furness, III et al. |

FOREIGN PATENT DOCUMENTS

| EP | 473343 A1 | * | 3/1992 |
| EP | 562742 A1 | * | 9/1993 |
| JP | 61-198892 | * | 9/1986 |

* cited by examiner

Primary Examiner—Jeffery Brier
(74) Attorney, Agent, or Firm—Steven P. Koda

(57) ABSTRACT

A scanning display produces an image having a plurality of image sectors for viewing by an eye. A first beam set is directed along a first beam path and modulated according to a first of the image sectors. A second beam set is directed along a second beam path and modulated according to a second of the image sectors. A biaxial scanning device receives the first beam set and the second beam set, and scans light from the first beam set along two axes toward a first region of a display field to produce the first image sector, and concurrently scans light from the second beam set along two axes toward a second region of the display field to produce the second image sector. The first region and second region are adjacent, substantially non-overlapping regions of the display field. The image is scanned within the display field.

6 Claims, 5 Drawing Sheets

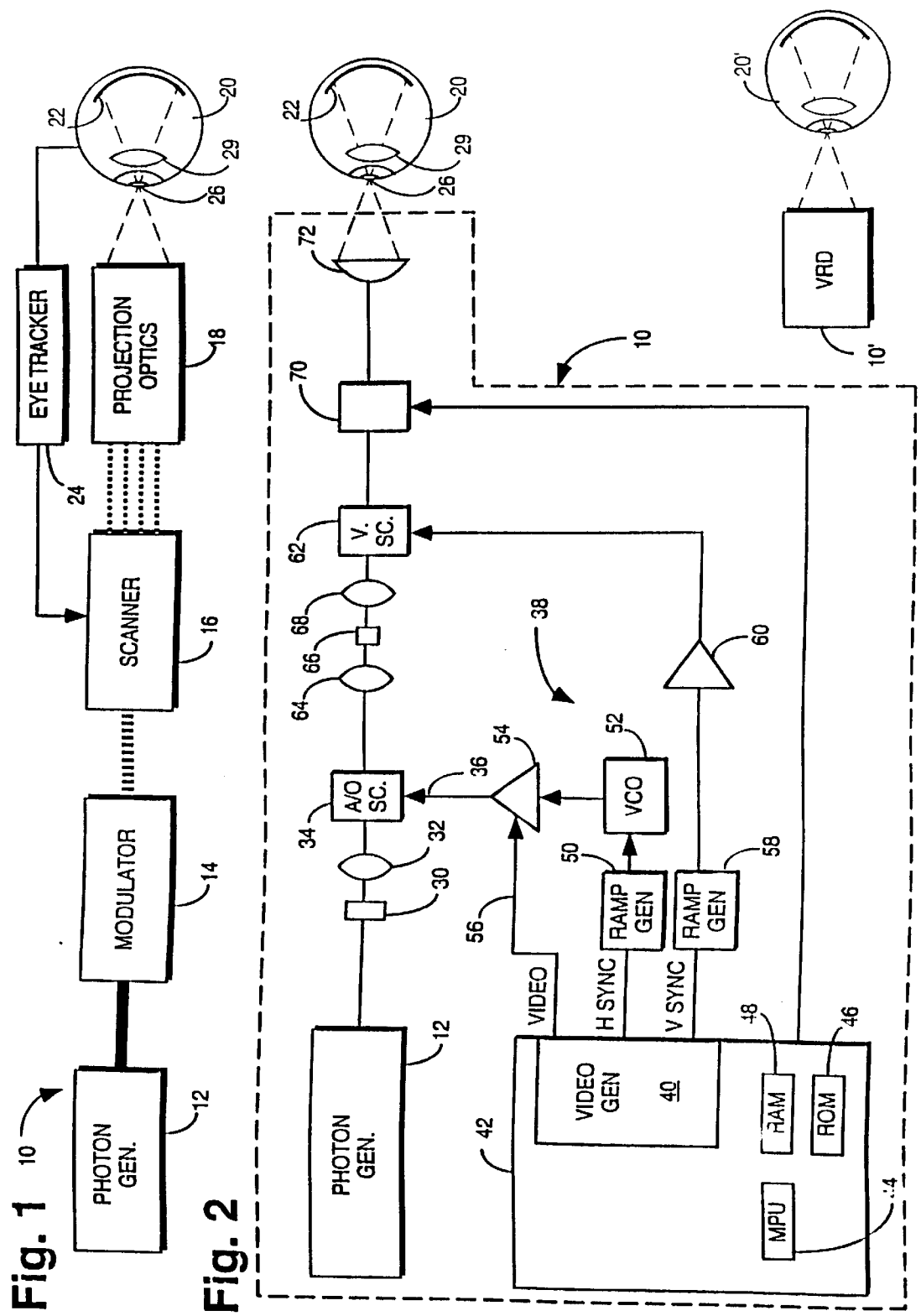

RETINAL DISPLAY SCANNING OF IMAGE WITH PLURALITY OF IMAGE SECTORS

CROSS REFERENCE TO RELATED APPLICATIONS

This application is a continuation of U.S. patent application Ser. No. 09/312,932 filed May 17, 1999 of Furness et al. for "Virtual Retinal Display and Method for Tracking Eye Position," and issued as U.S. Pat. No. 6,317,103 on Nov. 13, 2001, which is a continuation of U.S. patent application Ser. No. 08/911,989 filed Aug. 13, 1997 of Furness et al. for "Virtual Retinal Display" and issued as U.S. Pat. No. 6,008,781 on Dec. 28, 1999, which is a continuation of U.S. patent application Ser. No. 08/485,630 filed Jun. 7, 1995 and issued as U.S. Pat. No. 5,659,327 on Aug. 19, 1997, which in turn is a continuation of U.S. patent application Ser. No. 07/965,070 filed Oct. 22, 1992 of Furness et al. and issued as U.S. Pat. No. 5,467,104 on Nov. 14, 1995 for "Virtual Retinal Display."

BACKGROUND OF THE INVENTION

The present invention is directed to a virtual image display system and more particularly to a virtual retinal display wherein photons modulated with video information are projected directly onto the retina of the eye to produce a virtual image without a perceivable aerial image outside of the user's eye.

With known virtual image displays, a user does not view directly a physical display screen such as with real image displays. Typically, the virtual display creates only a small physical image using a liquid crystal array, light emitting diodes or a miniature cathode ray tube, CRT, the image being projected by optical lenses and mirrors so that the image appears to be a large picture suspended in the world.

A miniature cathode ray tube can produce a medium resolution monochrome picture. However, these devices are heavy and bulky. For example, a typical weight of a miniature CRT with cables is greater than four ounces, the CRT having a one inch diameter and a four inch length. Further, these devices have high voltage acceleration potential, typically 7–13 kilovolts which is undesirably high for a display that is mounted on a user's head. Creating color using a single miniature CRT is difficult and usually causes significant compromises in image resolution and luminance. Although the CRT image may be relayed via a coherent fiber-optics bundle to allow the CRT to be located away from head mounted optics, the hardware to accomplish this is also heavy and causes significant light loss. Field sequential color using a multiplexed color filter and CRT with white phosphor is able to create good color hue saturation but also at a significantly reduced resolution. For example, three color fields must be produced during the same period as a normal 60 Hz field, thereby dividing the video bandwidth for each color by three.

A liquid crystal array can produce a color image using a low operating voltage, but it can provide only a marginal picture element (pixel) density, i.e. less than 800 by 800 elements. One commercial device is known that uses a linear array of light emitting diodes viewed via a vibrating mirror and a simple magnifier. Although this is a low cost and low power alternative, the display is monochrome and limited in line resolution to the number of elements which can be incorporated into the linear array.

Both the CRT and liquid crystal display generate real images which are relayed to the eyes through an infinity optical system. The simplest optical system allows a user to view the image source through a simple magnifier lens. For fields of view greater than 30.degree., this approach leads to a number of problems including light loss and chromatic aberrations. Further, these optics are bulky and heavy.

Virtual projection optical designs create an aerial image somewhere in the optical path at an image plane which is then viewed as an erect virtual image via an eye piece or objective lens. This approach increases the flexibility by which the image from the image source can be folded around the user's head for a head mounted display system, but large fields of view require large and bulky reflective and refractive optical elements.

In addition to resolution limitations, current systems also have bandwidth deficiencies. Bandwidth is a measure of how fast the display system can address, modulate or change the light emissions of the display elements of the image source. The bandwidth of the display image source is computed on the basis of the number of elements which must be addressed over a given period of time. Addressing elements temporally is needed to refresh or maintain a perceived luminance of each element taking into account the light integration dynamics of retinal receptors and the rate at which information is likely to change. The minimum refresh rate is a function of the light adaptive state of the eye, display luminance, and pixel persistence, i.e. the length of time the picture element produces light after it has been addressed. Minimum refresh rates of 50 to 60 times a second are typically needed for television type displays. Further, an update rate of at least 30 Hz is needed to perceive continuous movement in a dynamic display or in a presentation in which the display image is stabilized as a result of head movement. Refreshing sequentially, i.e. one element at a time, 40 million picture elements at a 60 Mhz rate would require a video bandwidth of 2.4 GHz. Bandwidth requirements can be reduced by interlacing which tricks the eye in its perception of flicker but still requires that all of the elements of the image source be addressed to achieve a minimum update rate of 30 Hz or 1.2 GHz bandwidth. Typical television broadcast quality bandwidths are approximately 8 MHz, or two orders of magnitude less than the 1.2 GHz. High resolution computer terminals have 1400 by 1100 picture elements which are addressed at a 70 Hz non-interlaced rate which is the equivalent to a bandwidth of approximately 100 MHz.

SUMMARY OF THE INVENTION

In accordance with the present invention, the disadvantages of prior virtual image display systems have been overcome. The virtual retinal display of the present invention utilizes photon generation and manipulation to create a panoramic, high resolution, color virtual image that is projected directly onto the retina of the eye. The entrance pupil of the eye and the exit pupil or aperture of the virtual retinal display are coupled so that modulated light from a photon generator is scanned directly on to the retina producing the perception of an erect virtual image without an image plane outside of the user's eye, there being no real or aerial image that is viewed via a mirror or optics.

More particularly, the virtual retinal display system of the present invention includes a source of photons modulated with video information, the photons being scanned directly onto the retina of the user's eye. The photon generator utilized may produce coherent light such as a laser or it may produce non-coherent light. Further, the photon generator may include colored light generators such as red, green and blue light emitting diodes or lasers to provide colored light that is modulated with respective RGB video information. If a blue light source is not available, a yellow light source such as a yellow light emitting diode or laser may be used. The video modulated colored photons are combined and then scanned onto the retina.

The video modulated signals are preferably scanned in both a horizontal and a vertical direction so as to produce a modulated light raster that is projected directly onto the user's eye by projection optics. The projection optics may include a toroidal or spherical optical element such as a refractive lens, mirror, holographic element, etc. Further, this optical element may be a light occluding element or it may be light transmissive. A light transmissive optical element allows the virtual retinal display of the present invention to be a see through display wherein the displayed virtual image is perceived by the user to be superimposed on the real world. Further, the light transmissiveness of the optical element may be actively or passively variable.

The virtual retinal display system of the present invention further includes a depth cue for 3-D imaging so as to reduce problems of "simulator sickness" that may occur with known stereoscopic display systems. More particularly, the depth cue varies the focus, i.e. the convergence or divergence of the scanned photons rapidly to control the depth perceived by the user for each picture element of the image. Depth information may be stored in a Z axis buffer or the like in a video memory in addition to the horizontal and vertical information typically stored in a video frame buffer.

A pupil tracking system may be employed to move the position of the light raster projected onto the eye so that it approximately coincides with the entrance pupil of the user's eye. This feature increases the resolution of the virtual retinal display and further increases the field of view to provide a fully immersive environment such that as the eye moves to one side, a view corresponding to that direction may be presented. This is accomplished by utilizing the detected pupil position to position a "visible window" on the video information stored in the frame buffer. The frame buffer may for example store video information representing a panoramic view and the position of the visible window determines which part of the view the user is to perceive, the video information falling within the visible window being used to modulate the light from the photon generator.

The virtual display system of the present invention may also divide the video information into sectors or regions and use parallel photon generation and modulation to obtain ideal pixel density resolution across very wide fields of view. Further, by allowing the overall pixel density to be divided into separately scanned regions the bandwidth is reduced by the number of regions so as to overcome the bandwidth problems of prior systems.

The virtual retinal display of the present invention produces a wide field of view presentation which can reach 140° horizontally depending upon the size and proximity of the final optical element relative to the entrance pupil of the eye. Further, the virtual retinal display of the present invention is very small in size, weight and bulk since it is not necessary to produce either or a real or an aerial image. Because of its small size, weight and compactness the virtual retinal display is ideally suited for mounting on a user's head.

These and other objects, advantages and novel features of the present invention as well as details of an illustrated embodiment thereof, will be more fully understood from the following description and the drawing.

BRIEF DESCRIPTION OF THE DRAWINGS

FIG. 1 is a block diagram of the virtual retinal display of the present invention;

FIG. 2 is a block diagram illustrating one embodiment of the virtual retinal display depicted in FIG. 1;

DESCRIPTION OF SPECIFIC EMBODIMENTS

Figure 3:
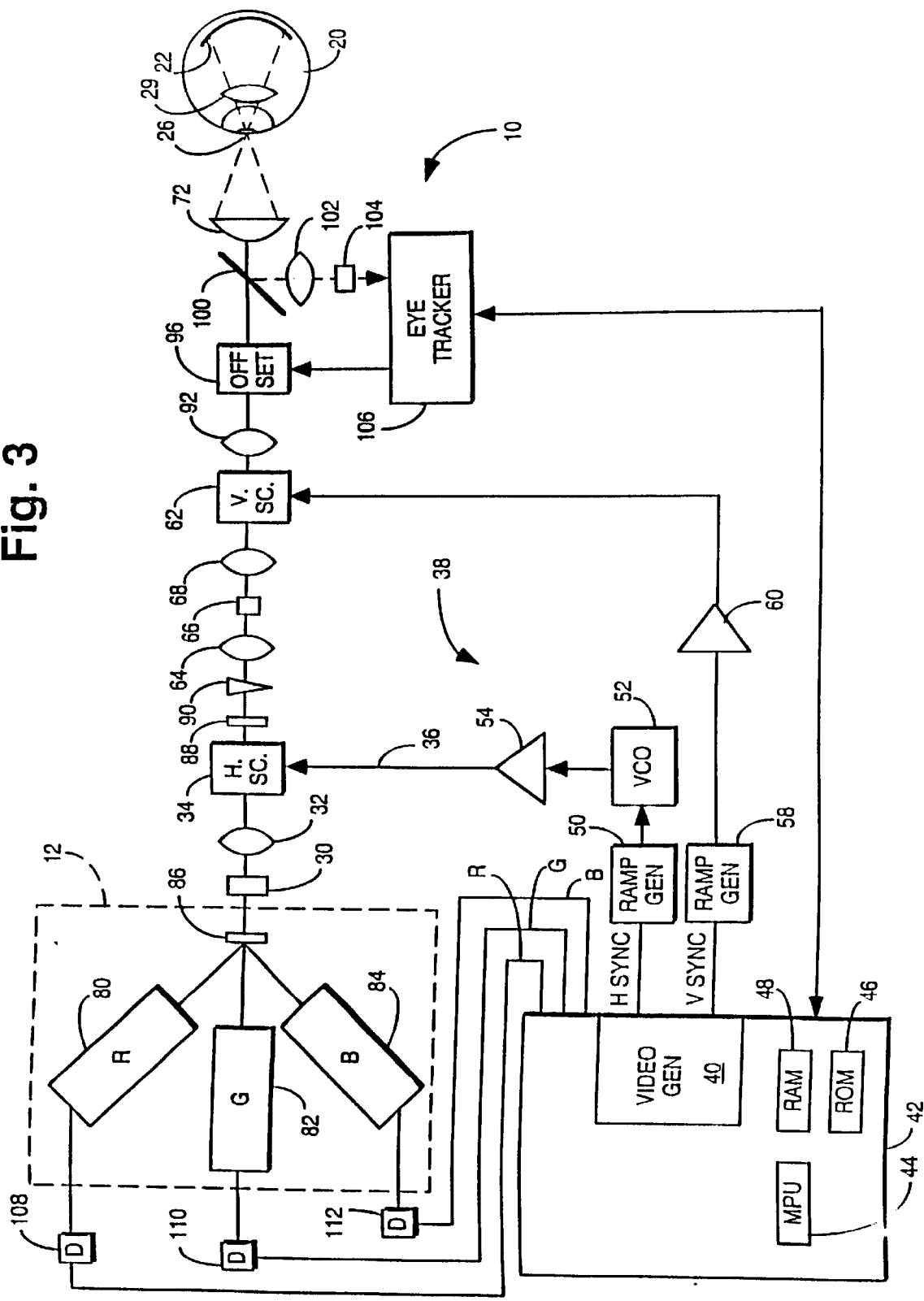
FIG. 3 is a second embodiment of the virtual retinal display of FIG. 1 utilizing color.

The virtual retinal display 10 of the present invention as shown in FIG. 1 utilizes photon generation and manipulation capable of creating a panoramic, high resolution, color image that is projected directly onto the eye of a user, there being no aerial image or image plane outside of the eye that is viewed by the user. The virtual retinal display does not use a display that generates a real image such as a CRT, LCD or LED array as in prior virtual image displays. Nor does the virtual retinal display 10 need the mirrors or optics necessary in prior virtual image displays to generate an aerial image. Instead, photons modulated with video information are scanned directly onto the retina 22 of a user's eye 20 to produce the perception of an erect virtual image. Because the virtual retinal display 10 does not utilize a real image display or the mirrors or optics necessary to generate an aerial image, the virtual retinal display 10 is small in size and weight and is therefore suitable to be easily mounted on the user's head as a head mounted display.

More particularly, as shown in FIG. 1, photons from a photon generator 12 are modulated with video information by a modulator 14. The modulated photons are scanned in a first direction and in a second direction generally perpendicular to the first direction by a scanner 16 to create a raster of photons that is projected directly onto the retina 22 of the eye 20 of the user by projection optics 18 to produce the perception of an erect virtual image without an aerial image or image plane outside of the eye that is viewed or perceived by the user. Although not necessary, it is desirable to employ an eye tracking system 24 to reposition the scanned raster of light as the pupil 26 of the eye 20 moves so that the light ray bundles are coincident with the entrance pupil of the eye. The eye tracking system 24 can also be used as feedback to change the image or the focus of the image scanned onto the retina as the eye moves so that the user perceives that he is focusing on a different portion of a panoramic scene as he shifts his eye. It is noted that the dotted lines shown entering the eye 20 in FIG. 1 as well as in subsequent figures represents the range of scanning and not the instantaneous ray bundle.

The photon generator 12 may generate coherent light such as a laser or it may generate noncoherent light such as by utilizing one or more LEDs. Further, beams of red, green and yellow or blue light may be modulated by RGY or RGB video signals to scan colored photons directly onto the user's eye. In order to reduce the bandwidth of the virtual retinal display, multiple monochromatic beams or multiple groups of colored beams can be modulated and scanned in parallel onto the retina where the video information used to modulate the photons is divided into different sectors or regions and each beam or group of colored beams is associated with a different sector of video information as described below. It is further noted that the functions performed by one or more of the photon generator 12, modulator 14, scanner 16 and projection optics 18 can be combined to be performed by fewer elements depending upon the actual components used in the system. For example, an acousto-optic deflector may be used to both modulate the light from the photon generator 12 and to scan the modulated light in at least one direction. Further, a laser phased array may be utilized to perform the functions of the photon generator, modulator and one or possibly two scanners as discussed below.

The components of the virtual retinal display 10 can be made small, compact and lightweight so that the virtual retinal display 10 can easily be mounted on the head of a user without requiring a helmet or an elaborate head mounting for structural support. Further, the photon generator 12 and modulator 14 can be separated from the scanner 16 and projection optics 18 so that only the scanner 16 and optics 18 need be mounted on the head of a user, the modulated photons being coupled to the scanner via one or more monofilament optical fibers. In a preferred embodiment, microscanners are utilized to scan the photons, such microscanners being small, thin and deflected to scan the photons in response to an electrical drive or deflection signal. The photon generator, modulator and scanner can therefore be made very small such as 1½ inch high by 1½ inch wide by ¼ inch thick or less with a weight of less than an ounce so as to facilitate a head mounting for the virtual retinal display 10.

In accordance with one embodiment of the present invention as shown in FIG. 2, high resolution scanners are used to deflect a beam of light both horizontally and vertically in a two dimensional raster pattern. No lens is used to focus the beam to form a real image in front of the eye. Instead, the lens 29 of the eye focuses the beam to a point on the back of the retina, the position of the beam point scanning the retina as the scanner 16 scans the modulated photons. The angle of deflection of the collimated light beams corresponds to the position of the focused spot on the retina for any given eye position just as if an image were scanned at an infinite distance away from the viewer. The intensity of the light is modulated by the video signal in order to create an image of desired contrast. Therefore, when the user's eye moves, the user will perceive a stationary image while he looks at different parts of the scene. The lateral extent of the image is proportional to the angle of the scan. Anamorphic optics are used as necessary to align the scanned photons and to scale the perceived image. By forming a reduced image of the scanner aperture, a proportionately larger scanning angle is yielded. Other than this, the size of the scanner image is irrelevant as long as the light enters the eye.

More particularly, as shown in FIG. 2, light or photons from a photon generator 12 is projected through a cylindrical lens 30 and a spherical lens 32 to an acousto-optical deflector 34 that scans the photons in a first or horizontal direction. The cylindrical lens spreads the light beam from the photon generator 12 horizontally so that it fills the aperture of the acousto-optical deflector 34. The spherical lens 32 horizontally collimates the light which impinges onto the acousto-optical deflector 34.

The acousto-optical deflector 34 is responsive to a video signal on a line 36 that is applied as a drive signal to a transducer of the acousto-optic deflector 34 to modulate the intensity of the photons or light from the photon generator 12 and to scan the modulated light from the photon generator 12 in a first direction or horizontally. The video signal on line 36 is provided by a video drive system generally designated 38 that includes a video controller 42. The video controller 42 may include a video generator such as a frame buffer 40 that provides video signals on a line 56 and respective horizontal sync and vertical sync signals. The video controller 42 may also include a microprocessor that operates in accordance with software stored in a ROM 46 or the like and utilizes a RAM 48 for scratch pad memory. The horizontal sync signal from the video generator 40 is converted to a ramp wave form by a ramp generator 50, the horizontal sync ramp waveform is applied to a voltage controlled oscillator 52 that provides a signal in response to the ramp input having a frequency that varies such that it chirps. The output from the voltage controlled oscillator 52 is applied to an amplifier 54 the gain of which is varied by the video data signal 56 output from the video generator 40 so that the video signal 36 output from the amplifier 54 has an amplitude that varies in accordance with the video information on line 56 and that has a frequency that varies in a chirped manner. The video signal on line 36 is applied to a drive transducer of the acousto-optical deflector 34. Varying the amplitude of the drive signal on line 36 with the video information causes the acousto-optical deflector 34 to modulate the intensity of the light from the photon generator 12 with the video information. Varying the frequency of the drive signal on line 36 in a chirped manner causes the acousto-optical deflector to vary the angle at which the light is deflected thereby so as to scan the light in a first or horizontal direction.

A spherical lens pair 64 and 68 images the horizontally scanned light or photons onto a vertical scanner 62 wherein a cylindrical lens 68 spreads the light vertically to fill the aperture of the vertical scanner 62. The vertical scanner 62 may for example be a galvanometer. The vertical sync signal output from the video generator 40 is converted to a ramp waveform by a ramp generator 58 and amplified by an amplifier 60 to drive the vertical scanner 62. The speed of scanning of the vertical scanner 62 is slower than the scanning of the horizontal scanner 34 so that the output of the vertical scanner 62 is a raster of photons. This raster of photons is projected directly onto the eye 20 of the user by projection optics taking the form of a toroidal or spherical optical element 72 such as a refractive lens, mirror, holographic element, etc.

The toroidal or spherical optical element 72 provides the final imaging and reduction of the scanned photons. More particularly, the toroidal or spherical optical element relays the scanned photons so that they are coincident near the entrance pupil 26 of the eye 20. Because a reduced image of the scanner aperture is formed, the deflection angles are multiplied in accordance with the Lagrange invariant wherein the field of view and image size are inversely proportional. As the size of the scanned photons, i.e. the exit aperture of the virtual retinal display are reduced, the field of view of the image perceived by the eye increases.

The optical element 72 can be an occluding element that does not transmit light from outside of the display system. Alternatively the optical element 72 can be made light transmissive to allow the user to view the real world through the element 72 wherein the user perceives the scanned virtual image generated by the display 10 superimposed on the real world. Further, the optical element 72 can be made variably transmissive to maintain the contrast between the outside world and the displayed virtual image. A passively variable light transmissive element 72 may be formed by sandwiching therein a photochromic material that is sensitive to light to change the light transmissiveness of the element as a function of the ambient light. An actively variable light transmissive element 72 may include a liquid crystal material. A photosensor can be used with such an element to detect the amount of ambient light wherein a bias voltage across the liquid crystal material is varied in accordance with the detected light to actively vary the light transmissiveness of the element 72.

The system described thus far with respect to FIG. 2 is monocular. In order to provide a stereoscopic system a second virtual retinal display 10' may be utilized in parallel with the first retinal display 10, the second virtual retinal display 10' projecting scanned photons modulated with the appropriate video information directly on the second eye 20' of the user. This provides a medium for binocular depth information so that displayed objects appear at different depths. Each pixel of the object, however, appears at the same distance from the user which can create a possible conflict between the stereoscopic cue and the monocular cue where the stereoscopic cue deals with the positioning of the object with respect to each eye and the monocular cue deals with the focus of the light of the object being imaged on the retina. More particularly, in prior virtual image display systems, each monocular image plane was typically focused at optical infinity causing each of the pixels within the virtual image to appear at one distance. However, the combination of two prior monocular systems to form the binocular view created a possible conflict between the distance cues and the focus or accommodation cue.

The virtual retinal display of the present invention overcomes this problem by utilizing an accommodation cue 70 either in the monocular display system 10 or in the binocular display system formed of displays 10 and 10'. The accommodation cue 70 is a focusing or depth cue that is controlled to vary the focus or convergence or divergence of the scanned photons rapidly to control the depth perceived for each picture element of the virtual image. Therefore in accordance with the present invention true depth perception is obtained by modulating each pixel for depth individually such as by controlling the focus, i.e. the convergence or divergence, of the individual pixel. The accommodation cue 70 includes a reflective surface that changes shape rapidly. For example, a miniature mirror having a deformable membrane whose shape is altered as the membrane is charged and discharged may be used to form the accommodation cue. The deformation of the membrane is thus varied by an electrical drive signal to control the convergence or divergence of each pixel for depth. The drive of the accommodation cue 70 is provided by the video controller 42 which may, for example, store a Z axis video information buffer in the memory 48 or in the video generator 40 in addition to the two dimensional video information in a typical frame buffer.

A further embodiment of the virtual retinal display 10 of the present invention is depicted in FIG. 3 for scanning colored photons directly onto the retina of a user's eye. As shown in FIG. 3, the photon generator 12 includes colored lasers or LEDs such as a red photon generator 80, a green photon generator 82 and a blue photon generator 84. If a blue photon generator is unavailable, a yellow photon generator may be utilized. The colored photons from the generators 80, 82 and 84 are modulated with respective RGB video information from the video generator 40 and then combined by a beam combiner/dispersion precompensator 86. The output of the beam combiner/dispersion precompensator 86 is projected onto the horizontal scanner 34 by the cylindrical lens 30 and the spherical lens 32. It is noted tht the horizontal scanner may be other than the acousto-optic scanner shown in FIG. 2. For example, a resonant mechanical scanner or various types of microscanners as discussed below may be used for the horizontal scanner. The horizontally scanned color modulated photons output from the scanner 34 are projected onto a dispersion compensator 88 the output of which is projected onto a prism before being projected onto the vertical scanner 62 by the spherical lens pair 64 and 68.

The colored photon raster as scanned from the output of the vertical scanner 62 is projected by a spherical lens 92 onto an offset mirror 96 which is moved by the eye tracker 106 so as to position the raster of photons directly onto the entrance pupil 26 of the eye 20 as the pupil moves. In one embodiment, a beam splitter 100 directs an image reflected off of the cornea of the eye 20 to a lens 102 and a position sensing diode 104 that is coupled to the eye tracker 106 to detect the position of the pupil 26. In response to the detected position of the pupil, the eye tracker correctly positions the offset mirror(s) 96 so that the exit pupil or aperture of the virtual retinal display is approximately aligned with the entrance pupil of the eye and/or to adjust the scan angle to reflect changed video information as described below.

The instantaneous position of the pupil 26 as determined by the eye tracker 106 is also communicated to the video controller 42 so that the microprocessor 44 can direct video information to modulate the colored light where the video information reflects a change in the direction of the user's view. More particularly, the detected pupil position is used by the microprocessor 44 to position a "visible window" on the video information stored in the frame buffer 40. The frame buffer 40 may for example store video information representing a panoramic view and the position of the visible window determines which part of the view the user is to perceive, the video information falling within the visible window being used to modulate the light from the photon generator 12.

It is noted that, because the acousto-optical deflector 34 diffracts red light more than green light and diffracts green light more than blue light, this variation in the diffraction must be compensated for. In accordance with the present invention, this variation in diffraction may be compensated for by appropriately delaying via delays 108, 110 and 112 the RGB video signals that are coupled to the respective red, green and blue photon generators 80, 82 and 84 to modulate the red, green and blue photons with the appropriate red, green and blue video information.

Figure 4:
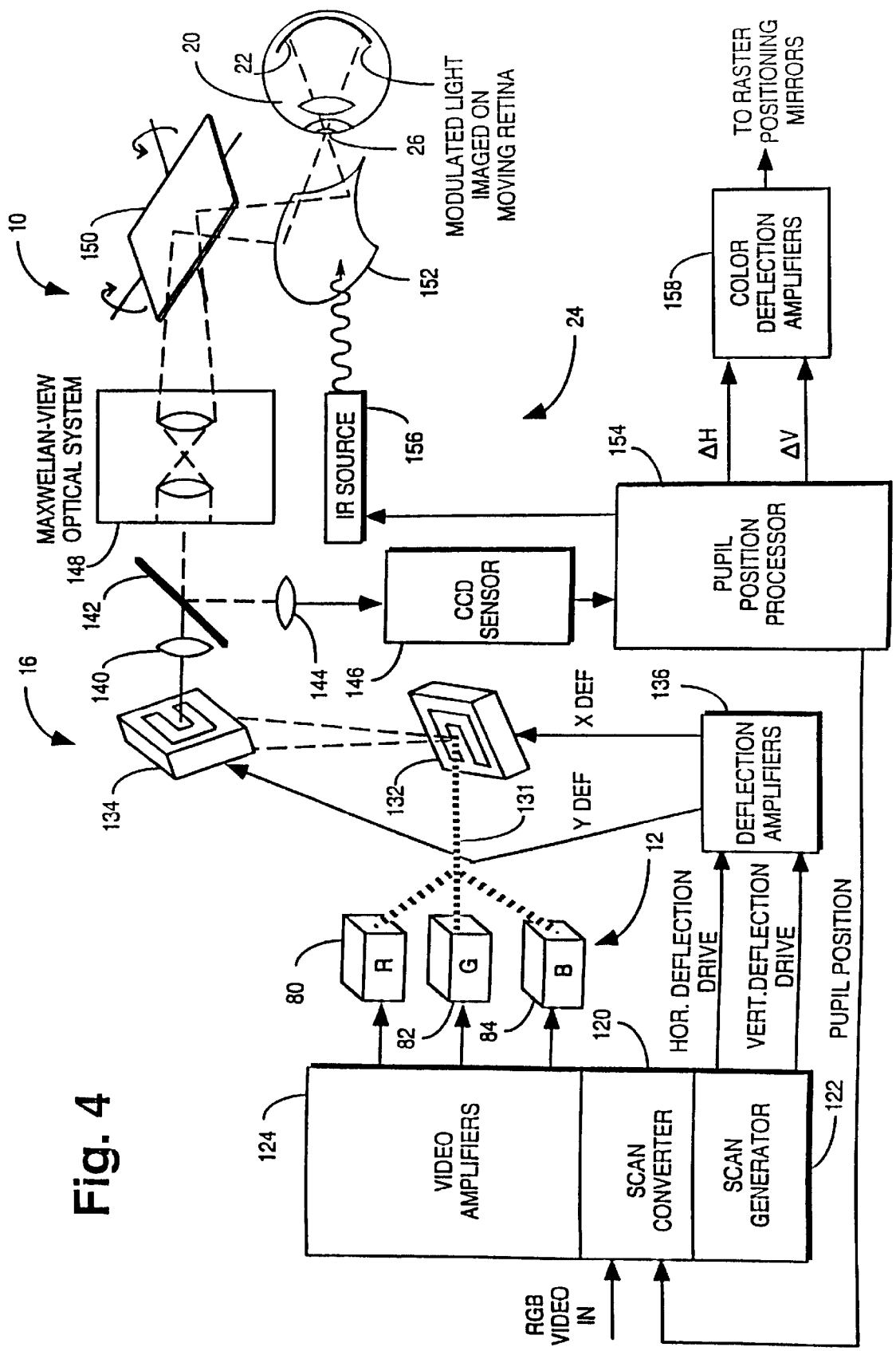
FIG. 4 is a block diagram illustrating another embodiment of a color virtual retinal display in accordance with the present invention.

In another embodiment of the virtual retinal display of the present invention as shown in FIG. 4, composite video or RGB video signals are received by a digital video scan converter 120 and separated into multiple compartments that represent sectors or regions of an image to be scanned. Multiple video drive signals output from the video amplifiers 124 representing each sector are used to modulate the light from the photon generator 12 in parallel. The photon generator may consist of either arrays of laser diodes or arrays of high luminance light emitting diodes. Multiple beams of red, green and yellow or blue light are modulated with the video signals in parallel for each of the divided sectors or regions and then relayed directly or by monofilament optical fibers 131 to a microscanner 16. The microscanner 16 essentially performs two functions. First, the microscanner scans the multiple color beams associated with each sector or region in two axes to create a raster of light on the retina and not an aerial image, there being no image plane between the photon generator 12 and the eye 20. Second, the microscanner 16 functions to position the scanned light relative to the instantaneous entrance pupil 26 of the eye as sensed by the eye tracker 24.

More particularly, the scanner 16 includes a first microscanner 132 that is responsive to an X axis deflection signal output from a deflection amplifier 136 to scan the color beams in a horizontal direction where the amplifier 136 is driven by the horizontal sync signal from a scan generator 122. A second microscanner 134 is responsive to a Y deflection signal from the deflection amplifiers 136 as driven by the vertical sync or deflection drive from the scan generator 122 to scan the horizontally scanned color photons in the vertical direction. A scan collimation lens 140 receives a two dimensionally modulated light field that is projected onto a tri-color combiner 142. The combiner 142 in turn projects the scanned light onto a Maxwellian-view optical system 148. The optical system 148 projects the scanned colored photons onto a raster position deflector which may include two axis galvo mirrors that in turn project the scanned light onto a toroidal optical element such as a combiner 152 having a trichoric coating, the toroidal combiner 152 projecting the scanned color photons directly onto the eye 20.

For eye tracking, the eye tracker 24 includes an infrared light source which illuminates the surface of the eye with low intensity infrared light either directly or indirectly as shown. The surface of the eye is viewed through the raster position deflector 150 via the combiner 142, a lens 140 and a charge coupled device, CCD, array 146. The signals from the CCD sensor 146 are processed by a pupil position processor 154 to generate null signals, .DELTA.H and .DELTA.V, that are coupled to respective color deflection amplifiers 158 and to the raster positioning mirrors 150 so as to cause the scanned photons to follow the pupil of the user's eye 20.

Figure 5:
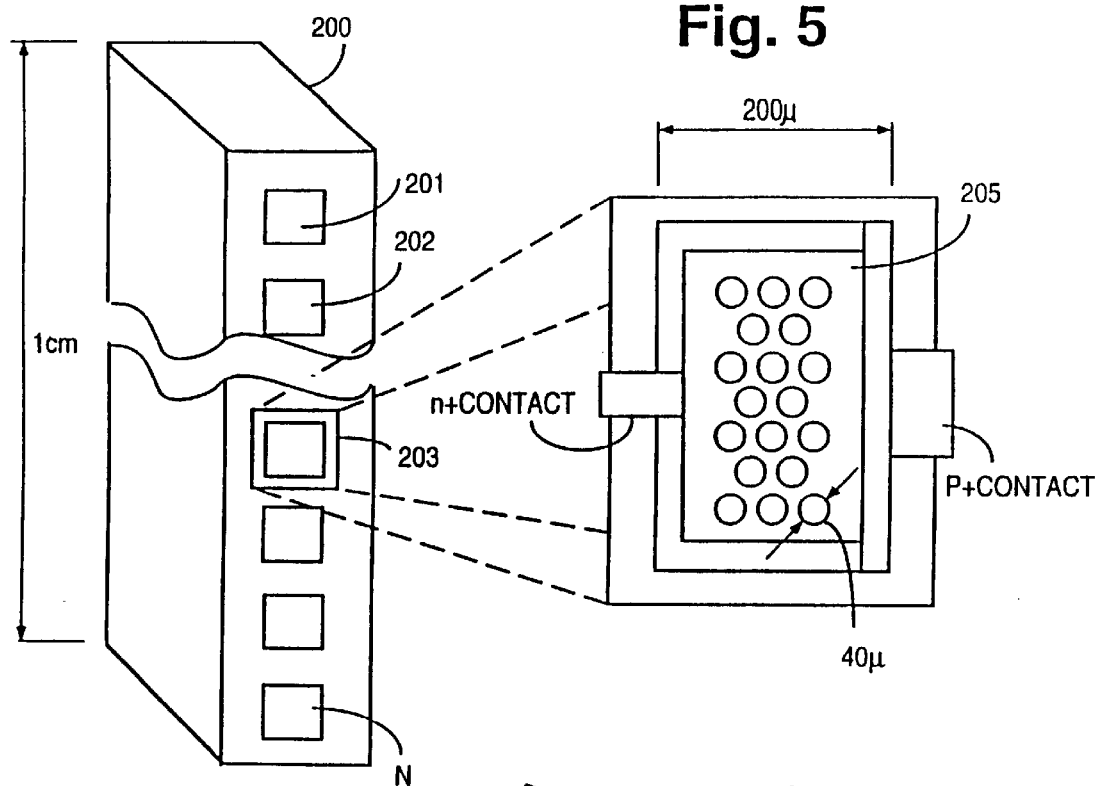
FIG. 5 is a diagram of an LED array utilized in a further embodiment of the virtual retinal display of the present invention employing parallel photon generation and modulation.

An example of a light emitting diode array suitable for use in the present invention is illustrated in FIG. 5. If an X-Y visual field is considered to be composed of an array of 2,000.times.2,000 resolvable spots or pixels, the spots must be refreshed 50 times per second so as to have an information bandwidth of approximately 200 MHz. High brightness LEDs typically have a power bandwidth curve that starts to roll off above 2 MHz. This result is essentially an R-C product limitation related to the diffusion capacitance of a heavily forward-biased p-n junction. In order to meet the bandwidth requirements of the system, a linear array of 50 to 100 LED pixels per color are utilized. Using a red, green and blue LED scheme would require 50–100 LEDs of each of these three colors. As shown in FIG. 5, an array 200 includes LED chips 201, 202, 203—N wherein each LED chip includes an LED active area 205. The LED active area may include a GaAsP alloys and a $Si_3N_4$ dielectric overlayer.

Figure 6:
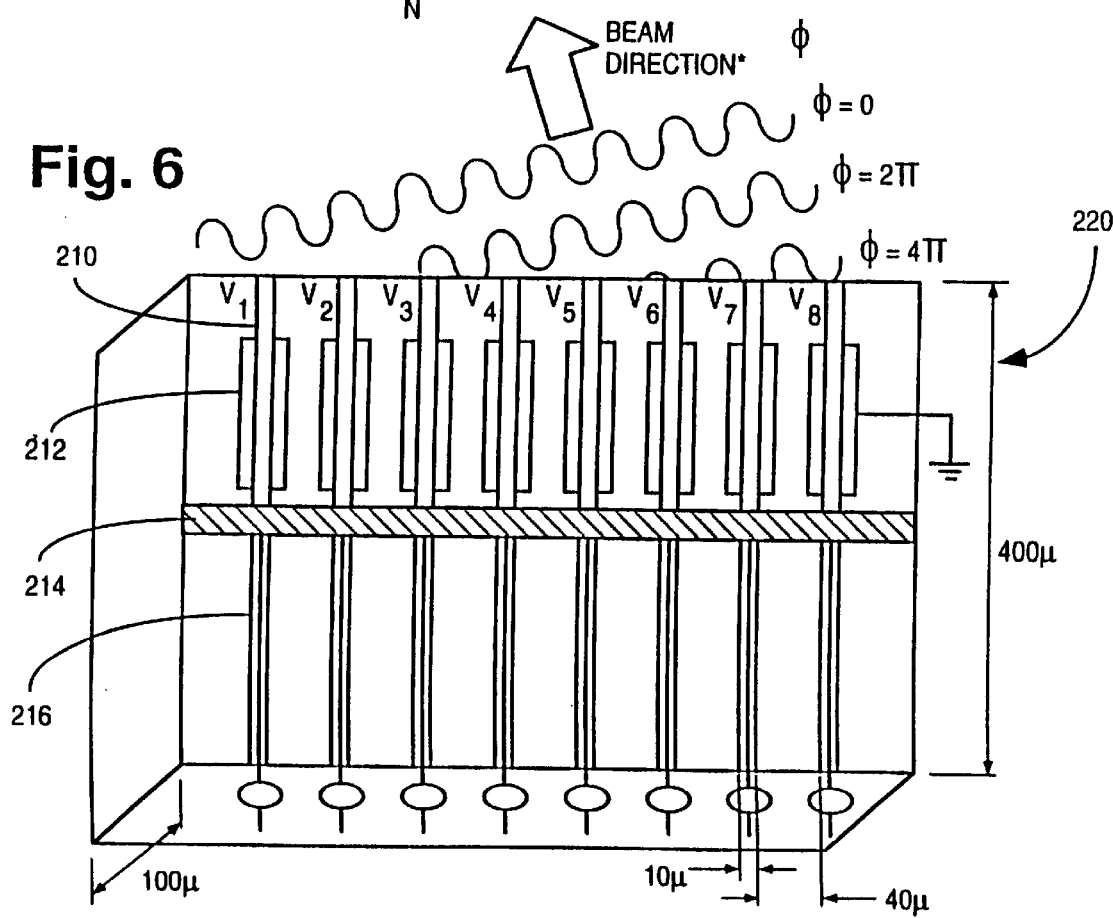
FIG. 6 is an illustration of a laser phased array.

A laser phased array as illustrated in FIG. 6 functions to perform photon generation, video modulation and scanning in at least one direction. The laser phased array includes a thin film wave guide 210, phase modulator electrodes 212, a cleaned coupled cavity 214 and laser cavities 216, the array emitting a coherent beam of about 10 mW power.

When two closely spaced lasers are fabricated in the same chip of material, their optical fields become coupled so that the processes of optical emission in the two devices are correlated and coherent. The result is a well defined phase front emitted from the laser pair. In the laser phased array 220 having a number of laser cavities 216, the optical beam is phase coherent if the lasers are spaced within 10 microns of each other. This resolution can be achieved by photolithographic techniques. The electro-optic modulator works by modifying the index of refraction of the wave guide medium 210 through which the optical beam must travel before being launched into free space. By separating the electrical contacts 212 for each modulator, the relative phase of each individual laser in the array can be modified by the modulator. For an appropriate series of modulation voltages, the phase front of the laser array coupled beam can be modified so that the emitted beam is launched at an angle to the normal exit direction. With the appropriate series of modulation voltages the laser beam can be scanned in a given direction. It is possible to construct a two axis laser phased array so that an additional scanner is not needed to scan the laser in a perpendicular direction.

Figure 7:
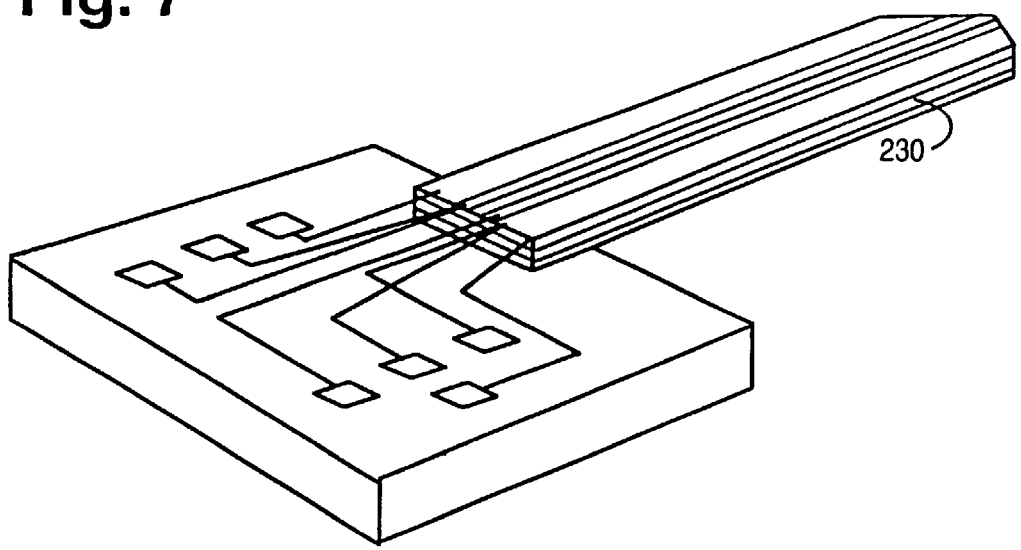
FIG. 7 is an illustration of a microscanner utilized in accordance with the present invention.

An example of a microscanner 132, 134 for scanning photons is illustrated in FIG. 7. The microscanner includes an actuator 230. The actuator 230 is a piezoelectric bimorph cantilever that is capable of three dimensional motion in response to an electrical drive signal. By controlling the deflection of the cantilevered actuator with the appropriate drive signals, the actuator 230 deflects the photons incident thereto to scan the photons.

Figure 8:
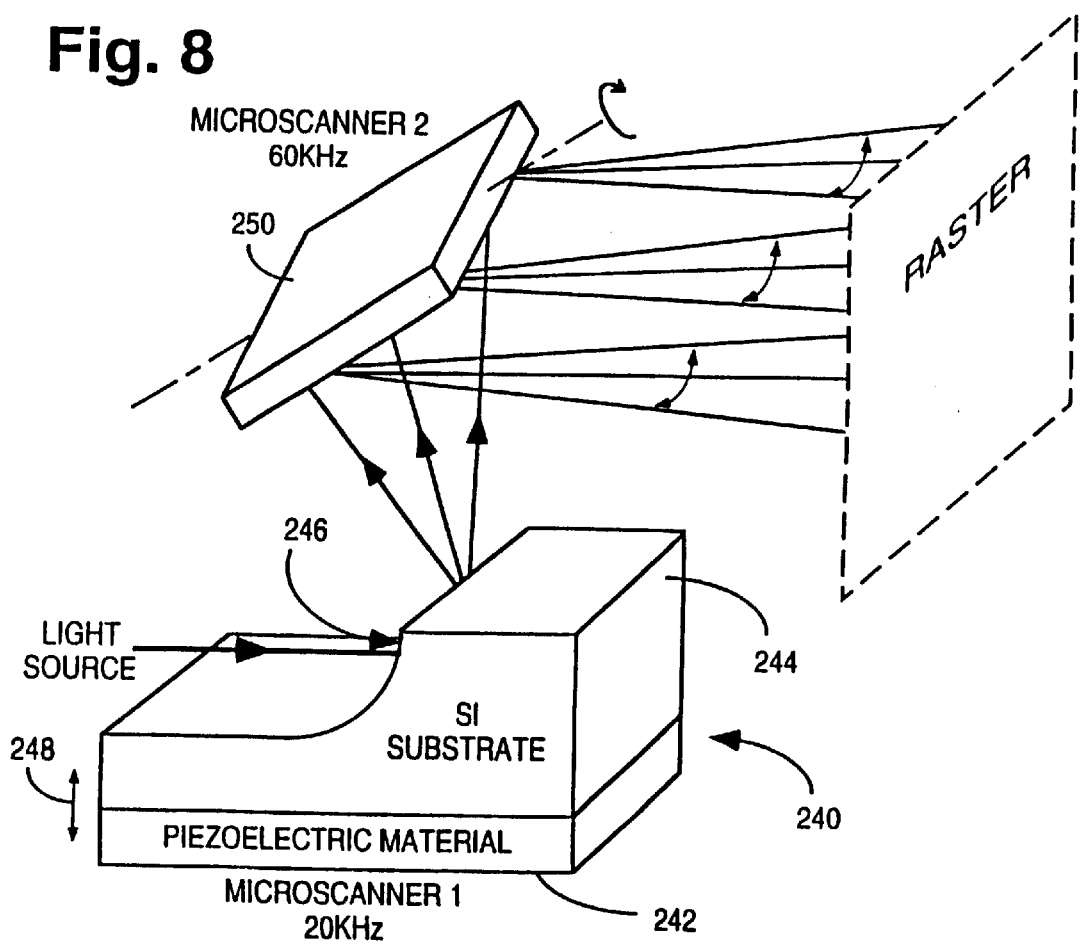
FIG. 8 is an illustration of another microscanner that may be utilized in accordance with the present invention.

Another example of a microscanner that can be made extremely small is shown in FIG. 8, the microscanner having a curved reflective surface that translates to scan light impinging thereon in one direction. More particularly, the microscanner 240 includes a base or actuator 242 formed of a piezoelectric material with a substrate 244 formed on the actuator 242 wherein the substrate 244 has a curved reflective surface 246. In response to a varying drive signal the piezoelectric actuator and the substrate 244 translate in the direction of the arrows 248 so as to scan the light impinging on the surface 246 of the substrate in a first direction generally perpendicular to the direction 248 of translation. A second microscanner 250 scans the light impinging thereon in a second direction perpendicular to the first direction so as to scan a raster image directly onto the retina of a user's eye.

Many modifications and variations of the present invention are possible in light of the above teachings. Thus, it is to be understood that, within the scope of the appended claims, the invention may be practiced otherwise than as described hereinabove.

What is claimed is:

1. A scanning display for producing an image for viewing by an eye, the image including a plurality of image sectors, comprising:

a first beam set modulated according to a first of the image sectors;

a second beam set modulated according to a second of the image sectors, the second sector being different from the first sector;

a biaxial scanning device receiving the first beam set and second beam set, the scanning device scanning light in parallel from the first beam set and the second beam set along two axes in a manner which reduces system bandwidth, wherein light from the first beam set is directed toward a first region of a display field to produce the first image sector and light from the second beam set is directed toward a second region of the display field to produce the second image sector, wherein the first region and second region are different regions of the display field;

a lensing system receiving light generated by the first beam set and light generated by the second beam set, the lensing system defining a first optical path from an input toward an output, the lensing system output adapted for transmitting light to and receiving light from the viewer's eye, wherein the light transmitted to the viewer's eye forms the image;

an optical detector receiving a portion of light reflected from the viewer's eye;

means for indicating from the detected received portion of light a position of the viewer's eye; and means for altering the image as a function of the indicated position of the viewer's eye.

2. The scanning display of claim 1, further comprising a frame buffer which stores data representing a panoramic image field, and wherein the altering means comprises means for selecting a visible window portion of the data within the frame buffer based on the indicated position of the viewer's eye, wherein the light forming the image displayed within the display field corresponds to the selected visible window portion of the panoramic image field.

3. The scanning display of claim 1, further comprising:

a source of tracking light output from the lensing system, the optical detector detecting the tracking light reflected from the viewer's eye.

4. A method for scanning an image onto a viewer's eye, comprising the steps of:

generating a first beam set of light modulated according to a first image sector of the image;

in parallel with the first beam set generation, generating a second beam set of light modulated according to a second image sector of the image;

receiving the first beam set and second beam set at a common scanning device;

scanning light from the first beam set along two axes to a first region of the display field;

scanning light from the second beam set along two axes to a second region of the display field, wherein light from of the first beam set and light from the second beam set is scanned in parallel reducing display bandwidth, the first region and second region being different regions of the display field;

receiving light generated by the first beam set and light generated by the second beam set at an input of a lensing system, the lensing system defining a first optical path from the input toward an output, the lensing system output adapted for transmitting light to and receiving light from the viewer's eye, wherein the light transmitted to the viewer's eye forms the image;

receiving, at the lensing system, light reflected from the viewer's eye;

directing a portion of the light reflected from the viewer's eye toward an optical detector;

deriving from the directed portion of light an electrical signal which is indicative of the viewer's eye position; and altering the image as a function of the indicated position of the viewer's eye.

5. The method of claim 4, further comprising the step of storing data representing a panoramic image field in a frame buffer, and wherein the step of altering comprises selecting a visible window portion of the data within the frame buffer, the visible window portion determined from the electrical signal which is indicative of the viewer's eye position, wherein the light forming the image displayed within the display field corresponds to the selected visible window portion of the panoramic image field.

6. The method of claim 4, further comprising the step of outputting tracking light from the lensing system, and wherein the step of directing comprises directing a portion of reflected tracking light toward the optical detector.

* * * * *